United States Patent [19]

Pfalzgraf et al.

[11] Patent Number: 5,116,194
[45] Date of Patent: May 26, 1992

[54] BORING HEAD

[75] Inventors: Emile Pfalzgraf, Bouxwiller; Claude Jaeger, Monswiller; Raymond Tugend, Unberach, all of France

[73] Assignee: E.P.B. Emile Pfalzgraf, S.A., Bouxwiller, France

[21] Appl. No.: 700,416

[22] Filed: May 15, 1991

[30] Foreign Application Priority Data

May 15, 1990 [FR] France .................. 90 06218

[51] Int. Cl.⁵ .............................................. B23B 51/12
[52] U.S. Cl. ...................................... 408/181; 408/147
[58] Field of Search .................. 408/18, 146, 147, 153, 408/181, 199, 238

[56] References Cited

U.S. PATENT DOCUMENTS

| | | | |
|---|---|---|---|
| 4,784,536 | 11/1988 | Pfalzgraf | 408/181 |
| 4,955,767 | 9/1990 | Kaiser et al. | 408/181 |

FOREIGN PATENT DOCUMENTS

| | | |
|---|---|---|
| 0044825 | 1/1982 | European Pat. Off. |
| 2158717 | 8/1973 | Fed. Rep. of Germany |
| 8526482.2 | 1/1986 | Fed. Rep. of Germany |
| 2561555 | 11/1988 | France |
| 656566 | 7/1986 | Switzerland |

*Primary Examiner*—Daniel W. Howell
*Attorney, Agent, or Firm*—Young & Thompson

[57] ABSTRACT

The present invention relates to a boring head constituted by a body (1) provided with a radial piston (2) for reception of a boring tool (3) gripped by means of a screw (4), said piston (2) being adjustable in position by means of a micrometric screw (5), characterized in that the body (1) is provided also with a slide block (6) effecting the guidance, the orientation and an end-of-movement abutment for the piston (2) for reception of the boring tool (3) and with a balancing device (7) with independent counterweights (8 and 9).

7 Claims, 2 Drawing Sheets

BORING HEAD

The present invention relates to the field of machine tool accessories, with numerical control, machining centers, cells and adaptable workshops and has for its object a boring head for the provision of precision holes having very exact geometric characteristics, by means of a range of interchangeable boring tools.

There are known at present devices permitting adjustment of the selected diameter, but these inevitably give rise to a mass disequilibrium which produces unbalance during the boring operation, this unbalance being the more noticeable as the speed of rotation increases. On the other hand, modern machines and the new materials used generally permit higher cutting speeds.

For this type of toolholder, precision is therefore very important during adjustment and it is also indispensable to avoid any variance during final setting.

To overcome this drawback there has been proposed in FR-A-2 561 555, a balancing device for drilling having the form of two counterweights interconnected at their ends by flexible connections and mounted on the drilling tool carrier, these counterweights being displaceable in rotation by means of a single covering and manipulating sleeve which can be locked in adjusted position by means of a set screw.

This device indeed permits correcting the unbalance occasioned by wearing away of the tool, but does not provide sufficient precision to eliminate unbalance, particularly when the tool must be turned at high speeds, the two counterweights interconnected by flexible connectors being difficult to regulate with sufficient precision. Moreover, this device is also subject to a problem arising from wear, particularly of the links interconnecting the counterweights, such that said links may extend and the precision of adjustment is affected.

Finally, in the mentioned document, the positioning of the tool is ensured only by a reception bore provided in a slide block which is radially displaceable and adjustable and its locking is effected merely by a pressure screw, such that a deviation during final locking is unavoidable.

The present invention has for its object to overcome these drawbacks.

It thus has for its object a boring head constituted by a body provided with a radial piston for reception of a boring tool adapted to be clamped by means of a screw, said piston being adjustable in position by means of a micrometric screw, characterized in that the body is also provided with a slide block effecting the guidance, orientation and an end of movement abutment for the piston that receives the boring tool and of the independent counterweight balancing device.

The invention will be better understood from the following description, which relates to a preferred embodiment, given by way of non-limiting example, and explained with reference to the accompanying schematic drawings, in which.

Figure 1:
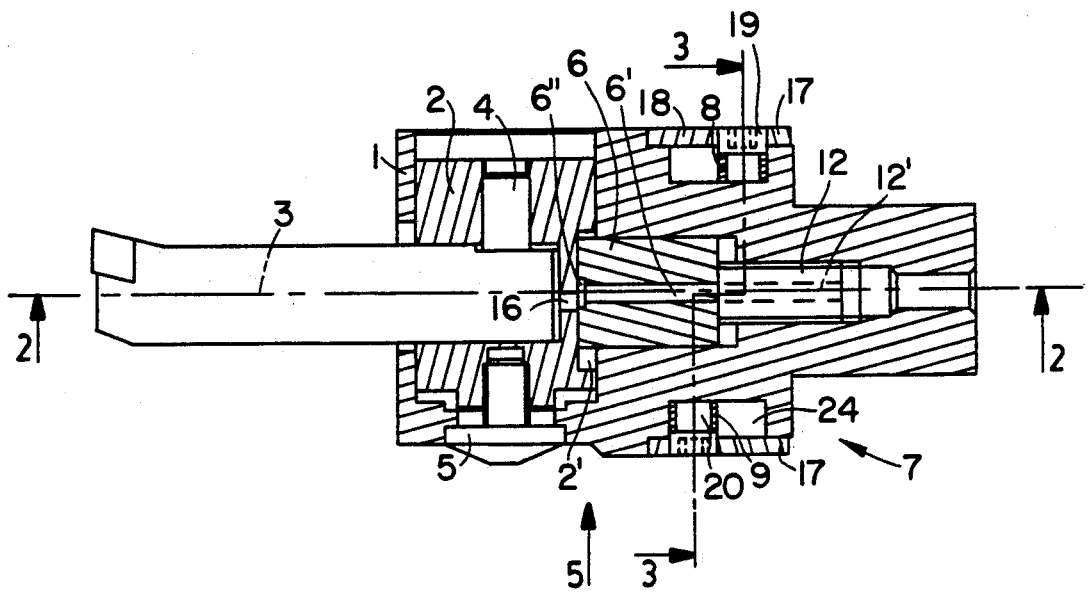
FIG. 1 is a side elevational and cross sectional view of a boring head according to the invention.
Figure 2:
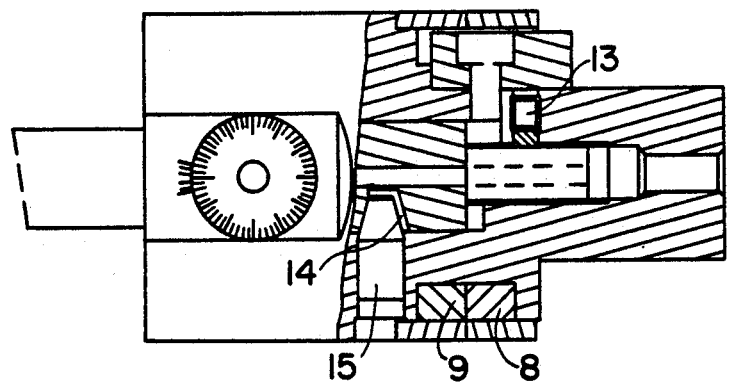
FIG. 2 is a view in the direction F and partially in cross section on the line A—A of FIG. 1.
Figure 3:
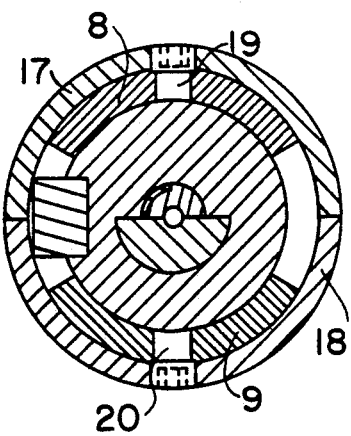
FIG. 3 is a cross-sectional view on line B—B of FIG. 1.
Figure 4:
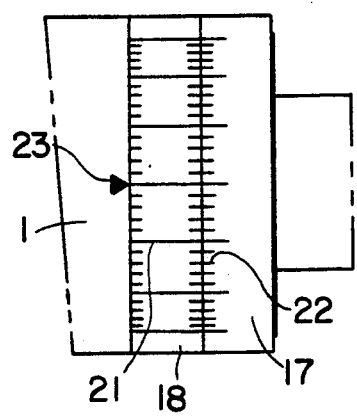
FIG. 4 is a partial plan view showing the verniers for adjusting balancing.

According to the invention and as shown more particularly by way of example in FIGS. 1 to 3 of the accompanying drawings, the boring head, constituted by a body 1 provided with a radial piston 2 for reception of a boring tool 3 adapted to be gripped by means of a screw 4, said piston 2 being adjustable in position by means of a micro-metric screw 5, is characterized in that the body 1 is provided also with a slide block 6 effecting the guidance, the orientation and an end-of-movement abutment of the piston 2 for reception of the boring tool 3 and of a balancing device 7 with separate counterweights 8 and 9.

Figure 5:
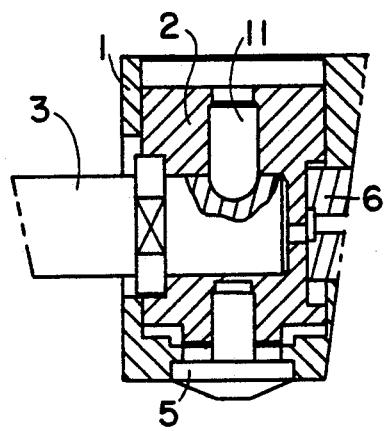
FIG. 5 is a partial cross-sectional view showing the mounting of a boring tool provided with a shoulder.

In the case of use of a boring tool 3 provided with a shoulder (FIG. 5) permitting bearing on the piston 2, said tool 3 is gripped in said piston 2 by means of a spherical-ended screw 11.

The slide block 6, which effects the guidance, the orientation and an end-of-movement abutment of the piston 2, coacts with a transverse flat 2' of the piston 2 and is urged on its surface opposite that in contact with the piston 2 by a screw 12 for adjustment of play between the slide block 6 and the piston 2, said screw 12 being locked in position by a pressure assembly 13.

The slide block 6 is moreover provided with a truncated conical bore 14 adapted to coact with a set screw 15 for locking the piston 2 in position. Thus, after application of the slide block 6 against the piston 2 by means of the adjustment screw 12 and locking in position of this latter by the pressure assembly 13, the slide block 6 can be clamped against the piston 2 by means of the set screw 15 and its position, as well as that of the tool 3 with which it is provided, can be locked to avoid any displacement.

Finally, the adjustment screw 12 and the slide block 6 are provided with central bores 12' and 6', respectively, the bore 6' of the slide block 6 opening on the side toward the piston 2 in shallow recess 6" which coacts with hole 16 of the piston 2 opening in the reception socket of the tool 3. Thus it is possible to effect a dispatch of the cutting fluid along the center of the boring head to the insert of tool 3.

The balancing device 7 with independent counterweights 8 and 9 is constituted moreover by rings 17 and 18 fixed respectively to the counterweights 8 and 9 by means of screws 19 and 20 effecting simultaneously the blocking in position of said rings 17, 18 and counterweights 8, 9, after adjustment, the counterweights 8 and 9 being preferably in the form of quarter rings of rectangular section guided in a groove 24 of the body 1.

Thus the position of the counterweights 8 and 9 can be adjusted individually by means of the corresponding rings 17 and 18, such that the adjustment of the balance may be effected in an optimum manner.

The rings 17 and 18 are preferably provided with graduations 21 and 22 adapted to coact with a fixed scale 23 provided on the body 1.

The graduations 21 and 22 permit, in cooperation with the reference mark 23, adjusting each ring 17 and 18 with its corresponding counterweight 8 and 9 as a function of the parameters inhering in a boring tool and in its diametric position, these values being adapted to be read on tables provided for this purpose.

Thanks to the invention, it is possible to provide a boring head whose tool adjustment may be effected in a particularly precise manner and of which the unbalance engendered by rotation of said tool in an eccentric position is compensated by a balancing device with independent counterweights.

Of course, the invention is not limited to the embodiment described and shown in the accompanying drawings. Modifications remain possible, particularly as to the construction of the various elements or by substitution of technical equivalents, without thereby departing from the scope of protection of the invention.

We claim:

1. Boring head constituted by a body (1) providing with a radial piston (2) for reception of a boring tool (3) clamped in the piston (2) by means of a screw (4), said piston (2) being adjustable in position by means of a micrometric screw (5), wherein the body (1) is provided also with a slide block (6) slidable axially within the body (1) effecting the guidance, the orientation and an end-of-travel abutment for the piston (2) for reception of the boring tool (3) and with a balancing device (7) with independent counterweights (8 and 9) carried by the body (1) and adjustable in position relative to the body to correct unbalance of the boring head.

2. Boring head according to claim 1, characterized in that the slide block (6), which effects the guidance, the orientation and an end-of-movement abutment of the piston (2), coacts with a transverse flat (2') of the piston (2) and is urged on its surface opposite that in contact with the piston (2) by a screw (12) for adjustment of the operative play between the slide block (6) and the piston (2), said screw (12) being set in position by a pressure assembly (13).

3. Boring head according to claim 1, characterized in that the slide block (6) is also provided with a truncated conical bore (14) adapted to coact with a set screw (15) for the setting in position of the piston (2).

4. Boring head according to claim 2, characterized in that the adjustment screw (12) and the slide block (6) are provided with a respective central bore (12' and 6'), the bore (6') of the slide block (6) opening on the side turned toward the piston (2) in a shallow recess (6") which coacts with a hole (16) of the piston (2) opening in a socket that receives the tool (3).

5. Boring head according to claim 1, characterized in that the balancing device (7) with independent counterweights (8 and 9) is constituted also by rings (17 and 18) fixed respectively to the counterweights (8 and 9) by means of screws (19 and 20) that fix the position of said rings (17, 18) and counterweights (8, 9), after adjustment.

6. Boring head according to claim 5, characterized in that the rings (17 and 18) are preferably provided with graduations (21 and 22) adapted to coact with a fixed reference mark (23) provided on the body (1).

7. Boring head according to claim 5, wherein the counterweights (8 and 9) are in the form of quarter rings of rectangular section guided in a throat (24) of the body (1).

* * * * *